Sheet 1—2 Sheets.
J. O. Taber.
Mower.
Nº 101,060. Patented Mar. 22, 1870.
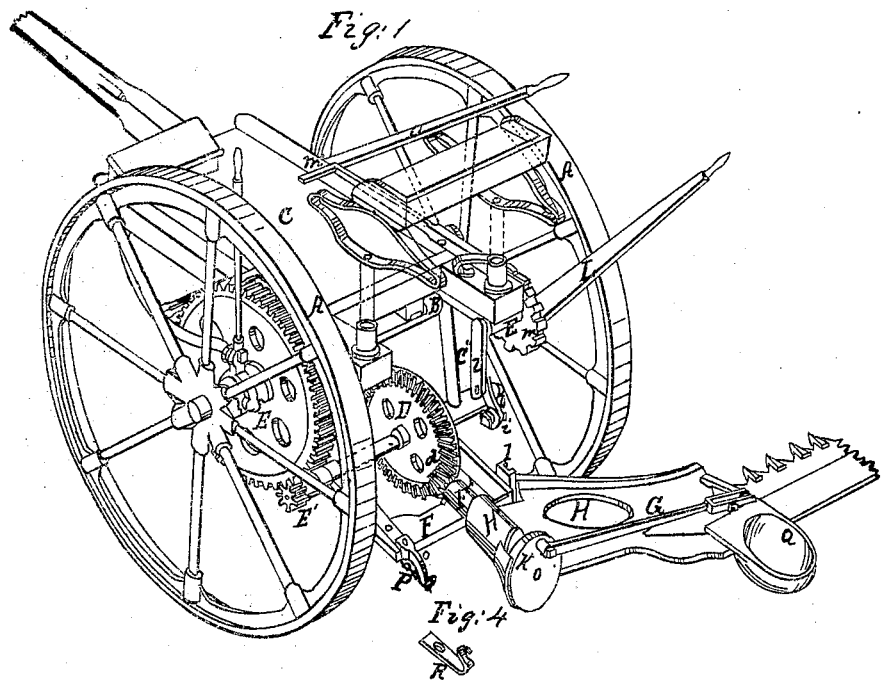
Witnesses.
Inventor.
J. O. Taber
by his attorney Sheet 2 – 2 Sheets.
J. O. Taber.
Mower.
Nº 101,060.     Patented Mar. 22. 1870.
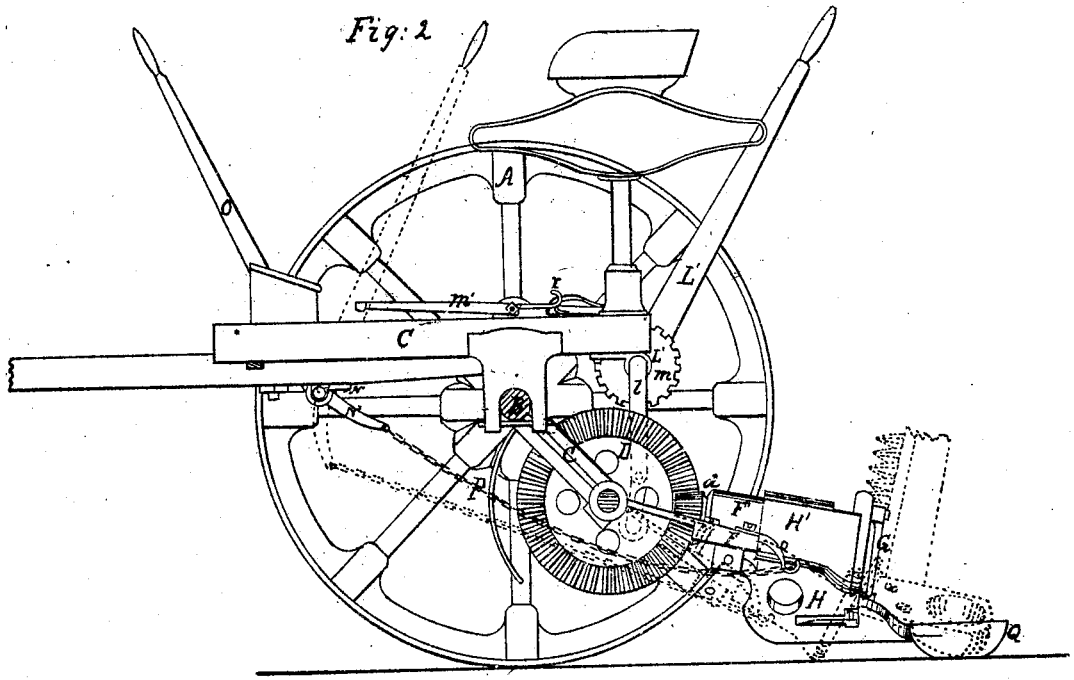
Fig: 2
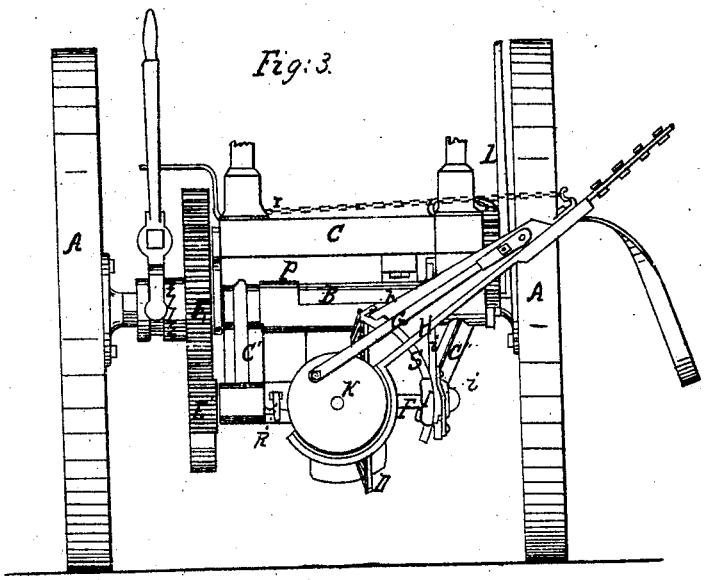
Fig: 3
Witnesses                                                        Inventor

United States Patent Office.

J. OSCAR TABER, OF SALEM, OHIO.

Letters Patent No. 101,060, dated March 22, 1870; antedated March 16, 1870.

COMBINED MOWER AND HEDGE-TRIMMER.

The Schedule referred to in these Letters Patent and making part of the same.

*To all whom it may concern:*

Be it known that I, J. OSCAR TABER, of Salem, in the county of Columbiana and the State of Ohio, have invented certain Improvements in the Construction of Combined Mowing and Hedge-Trimming Machines, of which the following is a full, clear, and exact description, reference being had to the accompanying drawing making part of this specification, in which—

Figure 1 is a perspective view of the machine as a mower;

Figure 2 is a side elevation showing in red lines the outer end of the cutter-bar elevated, as in passing over obstructions;

Figure 3 is a rear elevation of the machine as a hedge-trimmer;

Figure 4 represents a hook, used in suspending the shoe and cutter-bar, as in fig. 3; and Figure 5 is a longitudinal section of shoe on outer end of the cutter-bar, showing the manner of attaching the track-clearer.

Like letters refer to like parts in all the figures.

The extensive use of hedges in the west has rendered a machine for trimming them expeditiously almost a necessity, and there is a growing demand for a machine which is a first class mower, and which at the same time can be easily and with but little expense converted into an effective hedge-trimmer. My machine answers all of these requirements, as will be seen from the following description:

A A are the wheels.

B is the axle.

C, the main frame.

In the arms C' C" is shafted the bevel-wheel D, driven by the spur-wheel E, engaging with the pinion E', said arms C' C" being attached to a sleeve on the axle B, thus allowing a vibratory motion of the wheel D and pinion E', without becoming disengaged from the wheel E.

The frame F is hinged to the shaft of the bevel-wheel D, and vibrates in an arc of a circle of which said shaft is the center.

In a tubular bearing, F', on this vibrating frame, is mounted the crank-shaft K, to one end of which is keyed the beveled pinion I, driving said crank-shaft and the cutter by means of the pitman G.

H is a drag-plate and shoe, hinged to the frame F by the sleeve H', surrounding the tubular bearing F'

This drag plate is expanded inward toward the main frame, and provided with a lug, *h*, fig. 3.

A grooved or recessed rest or stay, I, is formed upon or attached to the frame F. This rest is in the form of an arc, the center of which is the crank-shaft K, thus allowing the lug *h* to move up and down in it, as required, when using the machine as a mower. This device assists materially in supporting the cutter-bar against backward strain, and relieving the hinge formed by the sleeve H and tubular bearing F' from the heavy strain which it would otherwise have to bear.

L is a lever, rigidly attached to a shaft rotating in the bearing L'.

Said shaft is provided with a crank-arm, *l*, through which, in connection with the link *l'* and lug *i*, the height of the cutter-bar from the ground is adjusted.

*m* is a toothed wheel, upon the same shaft with the lever L and crank-arm *l*.

*m'* is a foot-latch, pivoted upon the main frame, and engaging at one end with the toothed wheel *m*, for the purpose of maintaining any desired elevation of the cutting-apparatus.

N is an arm upon shaft N', operated by lever O.

P is a chain, attached at one end to arm N, and at the other to hook *o*, on the vibrating frame F.

By these last-named devices, the driver can raise the outer end of the cutter-bar by depressing the inner end of the drag-plate and shoe, the shoe Q serving as a fulcrum for that purpose.

S is a rest, provided with a notch or recess at its upper end to receive the lug *h*. This rest I make preferably in an arc of a circle, corresponding to the arc of stay I, in order that when said rest S is secured in stay I, the notch in the upper end shall be always in position to receive lug *h*.

V is a track-clearer, composed of a forked iron hanger, *o*, provided with a hook at one end, the swath-board V' and the stail *v*¹, secured to the swath-board by the metallic socket *v*², held by bolts or other suitable device.

The track-clearer is attached to the outer shoe on the cutter-bar by hooking or hinging it upon the pin *x'*, between the ears *x* projecting from the upper surface of said shoe, as shown in fig. 5.

W is a carrier or guide, of suitable material and shape to adapt it to pass under such lateral twigs or limbs as may lie close to the ground, and bring them up within reach of the cutters.

I do not consider it necessary to enter into a detailed description of my machine as a mower, preferring to explain more at length the manner of converting it into a hedge-trimmer. To do this, I take off the shoe Q, and put in its place the hook R, fig. 4; then detaching the chain from hook *o* and arm N, attach one end to the hook R, and the other to the hook *r*, on the main frame, as may be required, to effect the desired elevation of the drag-plate H; or the shoe Q may be left on and the hook R secured on the upper surface of the same by one of the bolts used to fasten it, as shown in fig. 3, thus supporting the frame F and inner end of drag-plate H; then by means of the rest S an exact arc of a circle, corresponding to that described by the stay I, support the outer end of the drag-plate and the cutter-bar at such an angle as may be desired, the rest S being secured to the stay I in any suitable manner.

One feature in the construction of my machine, which adapts it more perfectly to be used as a hedge-trimmer, is this, in the machines now in use, the heel of the cutter-bar can only be elevated to the proper height for reaping, so that if we carry the outer end up high enough to trim off the top of the hedge, we are obliged to set it (the cutter) up nearly perpendicular. This is objectionable, because it cuts the upper part of the hedge too thin, and for other reasons; but in my machine this difficulty is obviated, from the fact that the cutter-bar instead of being hinged just at its heel, has its center of motion transferred by means of the drag-plate and shoe H, to a point midway or thereabouts between the wheels. The effect of this arrangement is, that whenever the outer end of the cutting apparatus is elevated, the inner end is also elevated in proportion to its distance from the crank-shaft K, said crank-shaft being the center of vibration of both the drag-plate H and cutter-bar. This enables me to maintain the cutting apparatus while trimming the top of the hedge in a position nearly horizontal.

Another point which is gained by this construction is, that at whatever angle the cutters may be set, the pitman will vibrate them freely, and without any cramping, from the fact that the cutters and pitman must always maintain the same relative position to each other.

Having thus described the construction and operation of my machine,

What I claim as my invention, and desire to secure by Letters Patent, is—

1. In a two-wheeled combined mowing-machine and hedge-trimmer, a hinged cutting apparatus, which is adapted to conform to the surface of the ground in mowing, and to be set at any desired angle from the ground without changing either the cutting apparatus or the mechanism for operating the same, in combination with devices substantially as set forth, or the mechanical equivalents thereof, for supporting said cutting apparatus at the desired angle.

2. The rest S, constructed and operating as set forth.

3. The hook R, in combination with the chain P, drag-plate H, main frame C, and the rest S, or its equivalent, whereby the machine is changed from a mower to a hedge-trimmer, as set forth.

4. The guide or carrier W, in combination with the drag-plate H.

5. The track-clearer, constructed and applied substantially as set forth.

J. OSCAR TABER.

Witnesses:
EDWARD KENNETT,
THOMAS KENNETT